(12) United States Patent
Ganesan et al.

(10) Patent No.: US 10,539,938 B2
(45) Date of Patent: Jan. 21, 2020

(54) METHOD OF SMART SCENE MANAGEMENT USING BIG DATA PATTERN ANALYSIS

(71) Applicant: Ademco Inc., Golden Valley, MN (US)

(72) Inventors: Balamurugan Ganesan, Bangalore (IN); Manjunatha Divakara, Tumkur (IN); Shanmuga Prabhu M, Kumbakonam (IN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 16/429,449

(22) Filed: Jun. 3, 2019

(65) Prior Publication Data

US 2019/0286083 A1    Sep. 19, 2019

Related U.S. Application Data

(63) Continuation of application No. 14/886,301, filed on Oct. 19, 2015, now Pat. No. 10,353,360.

(51) Int. Cl.
*G05B 15/02*   (2006.01)
*F24F 11/30*   (2018.01)
*F24F 11/62*   (2018.01)
*H05B 37/02*   (2006.01)

(52) U.S. Cl.
CPC .............. *G05B 15/02* (2013.01); *F24F 11/30* (2018.01); *F24F 11/62* (2018.01); *H05B 37/02* (2013.01); *G05B 2219/2642* (2013.01)

(58) Field of Classification Search
CPC . G05B 15/02; G05B 2219/2642; F24F 11/62; F24F 11/30
See application file for complete search history.

(56) References Cited

U.S. PATENT DOCUMENTS

2014/0278742 A1   9/2014   MacMillan et al.
2015/0156031 A1   6/2015   Fadell et al.

OTHER PUBLICATIONS

Extended European search report for corresponding EP patent application 16193823.8, dated Mar. 8, 2017.

*Primary Examiner* — Douglas M Menz
(74) *Attorney, Agent, or Firm* — Husch Blackwell LLP

(57) ABSTRACT

An automation system including sensors that detect threats within a secured area, a plurality of prospective events defined within a memory of the automation system, each event including at least a physical change in an environment of the secured area, a time of execution of the physical change and a corresponding actuator that causes the physical change, a processor of the automation system that periodically activates the corresponding actuator at the time of each of the plurality of events, a processor that monitors each of the plurality of sensors for activation by an authorized human user and that saves a record of each activation to a cloud memory and a cloud processor that monitors the saved activation records of each sensor over a time period, determines a difference between the saved activations and the plurality of events and that modifies the plurality of events based upon the determined differences.

20 Claims, 3 Drawing Sheets

METHOD OF SMART SCENE MANAGEMENT USING BIG DATA PATTERN ANALYSIS

CROSS-REFERENCE TO RELATED APPLICATIONS

This application is a continuation of and claims the benefit of the filing date of U.S. application Ser. No. 14/886,301 filed Oct. 19, 2015.

FIELD

This application relates to home automation systems and more particular to security systems.

BACKGROUND

Systems are known to automate the homes of people. Such system may be used to simplify the lives of people living within their homes by automatically turning on their lights at sunset, activating a HVAC system before the homeowner arrives home after work and/or providing security within the home.

The security portion of a home automation system protects people and assets within secured areas of the home. Such systems are typically based upon the use of one more sensors that detect threats within the areas.

Threats to people and assets may originate from any of number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In most cases, threat detectors are connected to a local control panel. In the event of a threat detected via one of the sensors, the control panel may sound a local audible alarm. The control panel may also send a signal to a central monitoring station.

While conventional home automation systems work well, it is sometimes difficult or inconvenient to reprogram the automated features should the schedule of the homeowner change. Accordingly, a need exists for better methods and apparatus for simplifying the use of the automated features of a home automation system.

DETAILED DESCRIPTION

Figure 1:
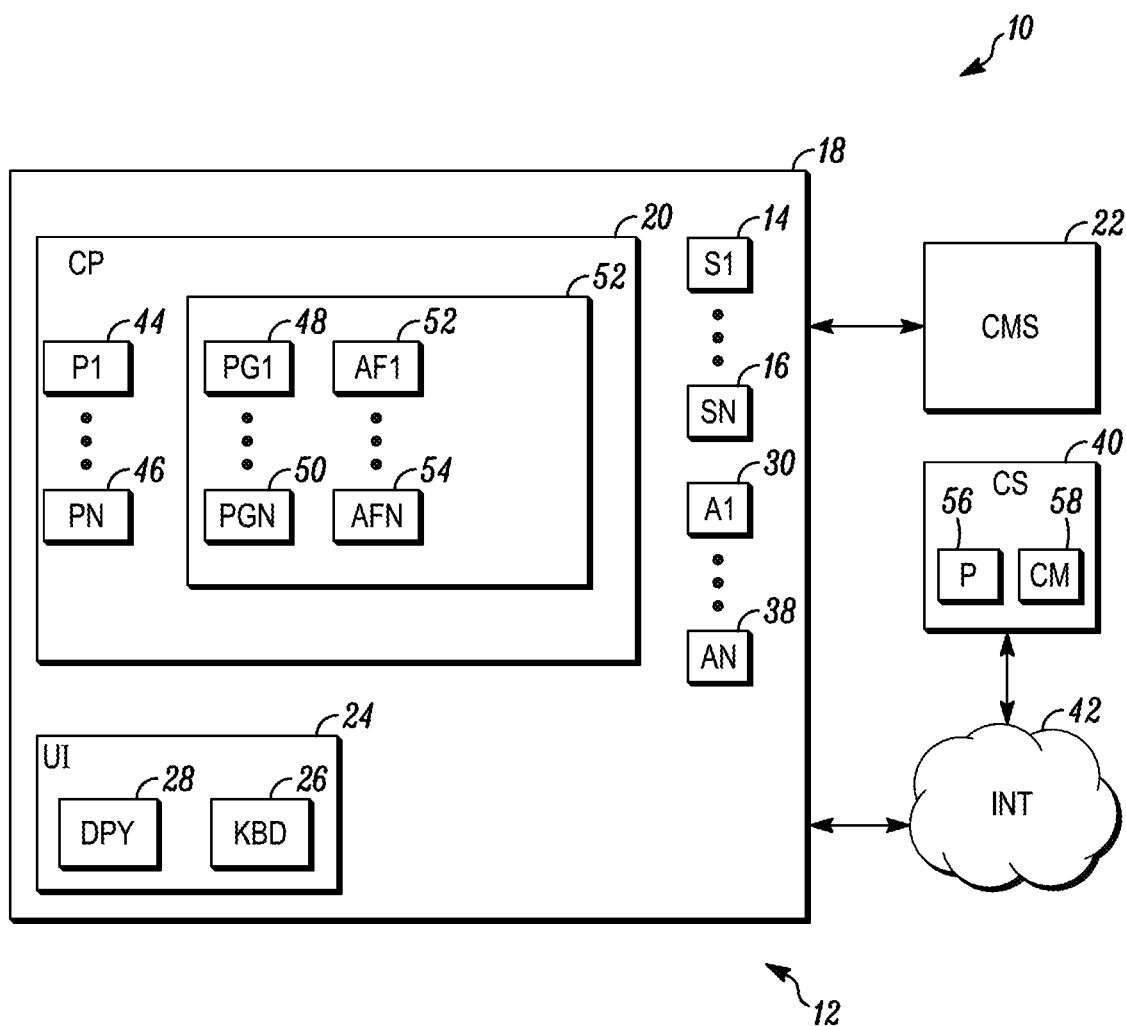
FIG. 1 illustrates a block diagram of a home automation system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

Alternatively, the home automation system may be considered to be part of the security system.

FIG. 1 depicts a home automation system 10 shown generally in accordance with an illustrated embodiment. A security system 12 may form a portion of the home automation system.

The security system may include a number of sensors 14, 16 that detect threats within a secured geographic area (e.g., a home) 18. The sensors may be embodied in any of a number of different forms. For example, at least some of the sensors may be limit switches placed on the doors and/or windows that provide entrance into and egress from the secured area. Other of the sensors may be passive infrared (PIR) detectors placed within an interior of the space in order to detect intruders who have been able to circumvent the sensors located along the periphery. Still other of the sensors may be closed circuit television (CCTV) cameras with motion detection capabilities.

Other of the sensors may be environmental detectors. For example, these sensors may detect fire, smoke or natural gas.

The sensors may be monitored by a control panel 20. Upon activation of one of the sensors, the control panel may send an alarm message to a central monitoring station 22. The central monitoring station may respond by summoning the appropriate help (e.g., police, fire department, etc.).

The home automation (and security system) may be controlled via a user interface 24. To arm the security system, an authorized human user may enter a personal identification number (PIN) and function key through a keyboard 26 to arm and/or disarm the system. Status information may be shown on a display 28.

Included within the home automation system may be one or more actuators 30, 32. The actuators may control environmental aspects of the secured area. For example, some of the actuators may activate and deactivate lights. Other of the actuators may control heating, ventilating and air conditioning (HVAC) units. Still other actuators may activate and deactivate home entertainment systems.

The actuators may be controlled via the user interface and control panel. In this regard, the actuators may be directly controlled by the user interface or via one or more timers and associated control modules within the control panel.

The home automation system may also include a cloud monitoring and control system 40 connected to the home automation system via the Internet 42. The cloud system monitors the security system and dynamically modifies control of the actuators based upon the detected activities of authorized human users of the secured area.

Included within the control panel, the user interface, each of the sensors and actuators and the cloud system may be control circuitry that accomplishes the functionality described herein. The control circuitry may include one or more processor apparatus (processors) 44, 46, each operating under control of one or more computer programs 48, 50 loaded from a non-transient computer readable medium (memory) 52. As used herein reference to a step performed by a computer program is also reference to the processor that executed that step.

For example, a status processor may monitor the user interface for instructions from a user. For example, upon entry of an arm command, the status processor may enter an armed station. Upon entry of a PIN and disarm command, the status processor may enter disarmed state.

Similarly, an alarm processor may monitor the status processor and sensors. In the armed state, the alarm processor may monitor the sensors for threats. Upon detection of a threat, the alarm processor may compose an alarm message including at least an identifier of the system (e.g., an address, account number, identifier of the type of sensor, an identifier of the sensor, a location of the sensor within the secured area and a time).

One or more automation processors may control the actuators via a corresponding actuator file 52, 54. Each actuator file may contain an identifier of the corresponding actuator and a corresponding event for activating the actuator and for deactivating the actuator. The event may be a time of day, week or month or some other event.

The actuator files may be created via information entered through the user interface or provided by the cloud system. For example, the user may enter an identifier of an actuator of a light within a particular room or area of the secured area and a time for activation and deactivation of the light. The time for activation may be the time that the user returns from work each day. The time for deactivation may be normal time that the user goes to bed.

Another actuator file may be associated with the HVAC system of the home. The actuator may activate the HVAC system when the user returns from work in the evening and deactivates the HVAC system in the morning when the user leaves for work. Alternatively, the actuator may be a thermostat that lowers a set point of the thermostat for heating when the user leaves for work or raises the set point for air condition when the user leaves for work in the morning.

Under an illustrated embodiment, the events triggered by the detected activities of authorized users of the secured area are processed by a cloud processor 56 to modify or supplement the control of the environment within the secured area. In this regard, activation of the actuators creates different environmental scenes based upon the number and types of actuators activated. In general, an automation processor operates under control of an actuator file to create the desired environmental scene (e.g., turning on a light at 6 pm, etc.). In this regard, an actuator file identifies an actuator and how that actuator is be used.

In order to modify and create actuator files, events within the secured area may be detected by a monitoring processor and saved into a cloud memory 58 through the Internet. Events may be detected via the sensors or via the control panel. In this regard, the control panel in some cases may operate as a sensor to detect user activity. For example, in the armed state, when the authorized user returns home and enters his/her PIN and a disarm key, the panel is used to sense return of an authorized user to the secured area. The monitoring processor detects this event and saves a record of the event into the cloud memory in a manner similar to any other sensor event.

Similarly, in the disarmed state, the threat sensors are not used for detecting threats. In the disarmed state, the threat sensors may be used to detect events triggered by authorized users of the secured area. For example, each time the user opens a door or enters a particular room, a limit switch or motion detector is activated and detected by the monitoring processor. Upon detection of the event, a record of the event is saved to the cloud memory.

The cloud processor retrieves detected events from the cloud memory and begins processing the data over predetermined time periods for repeating events that suggest modification of an existing environmental scene or the creation of a new scene. For example, each time an authorized user returns home from work, the time of entry of a disarm instruction may be noted and compared to times of entry of disarm commands on other workdays. Over some time period (e.g., a week, a month, etc.) an average time of day of entry of the disarm command is determined. The average time of entry of the disarm command is compared with a content of the actuator files. For example, if an actuator file is programmed by a user to activate an air conditioning unit at 5 pm and the average time of entry of the disarm command is 6 pm, then the cloud processor determines that the actuator file controlling the time of activation of the air conditioner should be changed from 5 pm to 6 pm.

In order to accomplish this change, the cloud processor or associated processor generates a change request for presentation to the user on the user interface. If the user accepts change, then a change processor changes the actuator file to reflect the 6 pm activation time for the air conditioner.

In another example, an authorized user may remain at home during weekdays with the security system in an alarm stay state. In this case, the security system only monitors sensors along a periphery of the secured area. In this situation, the monitoring processor may detect the normal activities of the authorized user within the interior of the secured area. For example, if the user is an early riser and activates a particular light every morning at a particular time, then the average time of that activation is determined over some appropriate time period. The cloud processor then searches the actuator files for an activity that corresponds to this detected event (i.e., activation of that particular light). If a corresponding file cannot be found for this actuator, then the cloud processor creates a new actuator file for activating the light at the determined average time.

In general, prior security products have included life safety features and in some cases, have also supported other life style features including home automation features such as lighting control, thermostat control, vertical blind control, etc. for smart energy utilization and for enhancing the user's comfort and convenience. These kinds of home automation features are handled by static scene configuration features provided through a user interface. A static scene in this case means something that happens the same way every day (e.g., turning on a light at 5 pm and turning it off at 6 pm). However static scenes have a number of limitations. For example, the installer has to understand the full scope of the requirements (e.g., desired event timings, desired event actions required by the use, etc.) of the user within the premises in advance of initial installation or updates. If there is a change in the desired event timing, or desired event actions between updates, then the installer or user is required to manually modify the static scene through the control panel every time there is a change.

The existence of static scenes or features do not allow for the easy addition of new features. They must be handled manually. If the prerequisite conditions justifying the static scene configurations then change, the configurations may be rendered obsolete.

These limitations are overcome by the system of FIG. 1 by using pattern study from existing inputs devices such as motion sensors and cameras. In the past, scene management in security products have been provided with a set of planned or desired events which will lead to a set of actions which are all preconfigured as static scenes. Using the system of FIG. 1, it is possible to intelligently modify/add/delete existing static scenes in security products by understanding a user's activity in the premises during a preconfigured period using the detected events/point data provided and, therefore, available within a memory in the cloud. The user's activity pattern over the time period is formed based on observations and study from the existing cameras and motion sensors in the premises using Big Data analysis.

Using the system of FIG. 1, it is possible to achieve smart energy utilization in the premises by properly modifying and/or deleting the desired event actions of the static scenes as per the user patterns observed for a predefined period. Using the system of FIG. 1, it is possible to provide more comfort and convenience to the user by automatically modifying the desired event actions of the static scenes as per the user pattern observed for a predefined period.

Using the system of FIG. 1, it is possible to provide more comfort and convenience to the user by automatically identifying any new desired event actions which are missing in the existing static scene schema. These can be proposed for user confirmation and subsequently added to the scene. The system of FIG. 1 is based upon the use of Big Data pattern analysis of data from the sensors of the security system and can be used for adding/modifying/disabling the existing static scenes of the home automation system.

Figure 2:
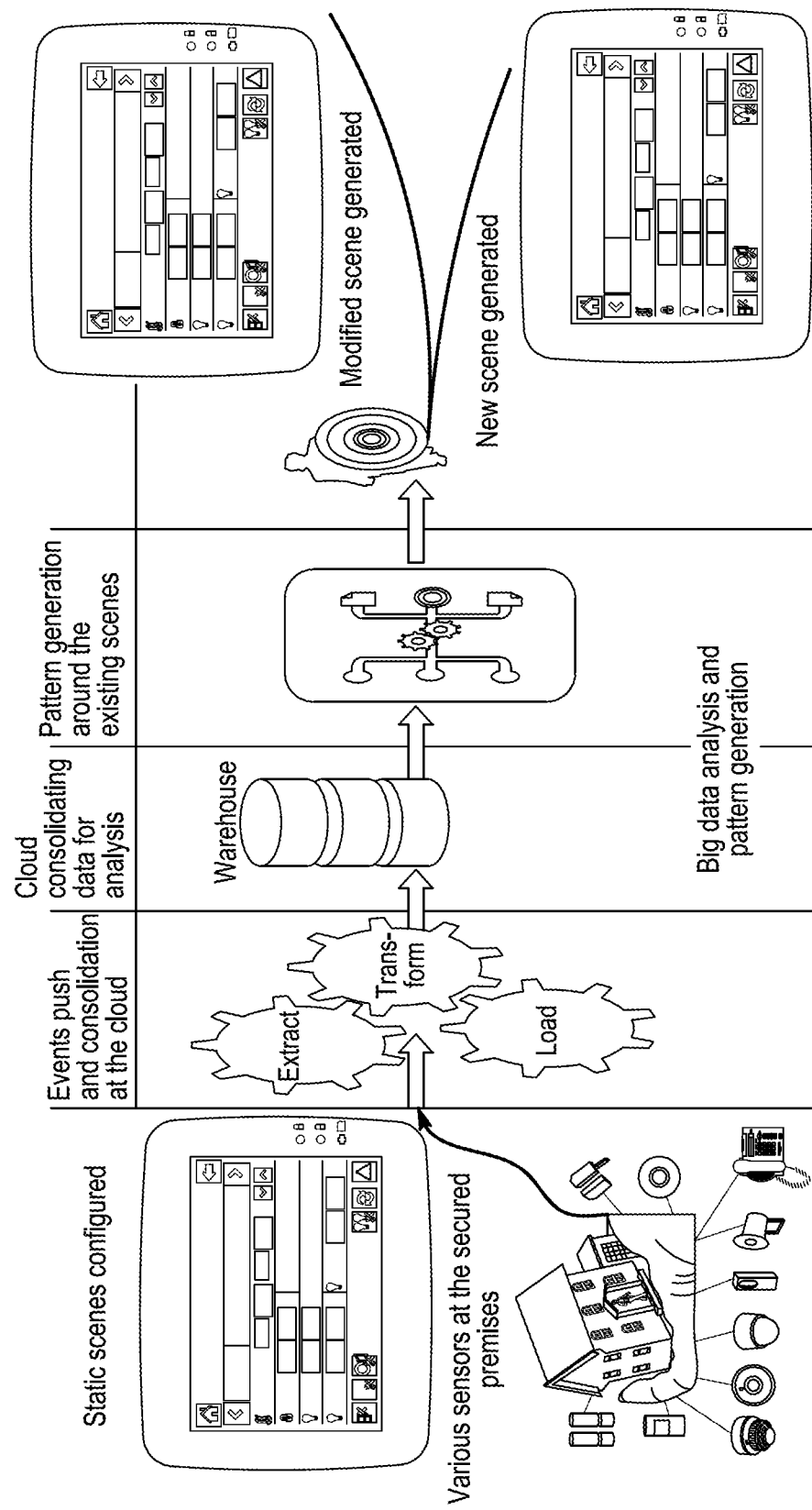
FIG. 2 illustrates information flow of the system of FIG. 1
Figure 3:
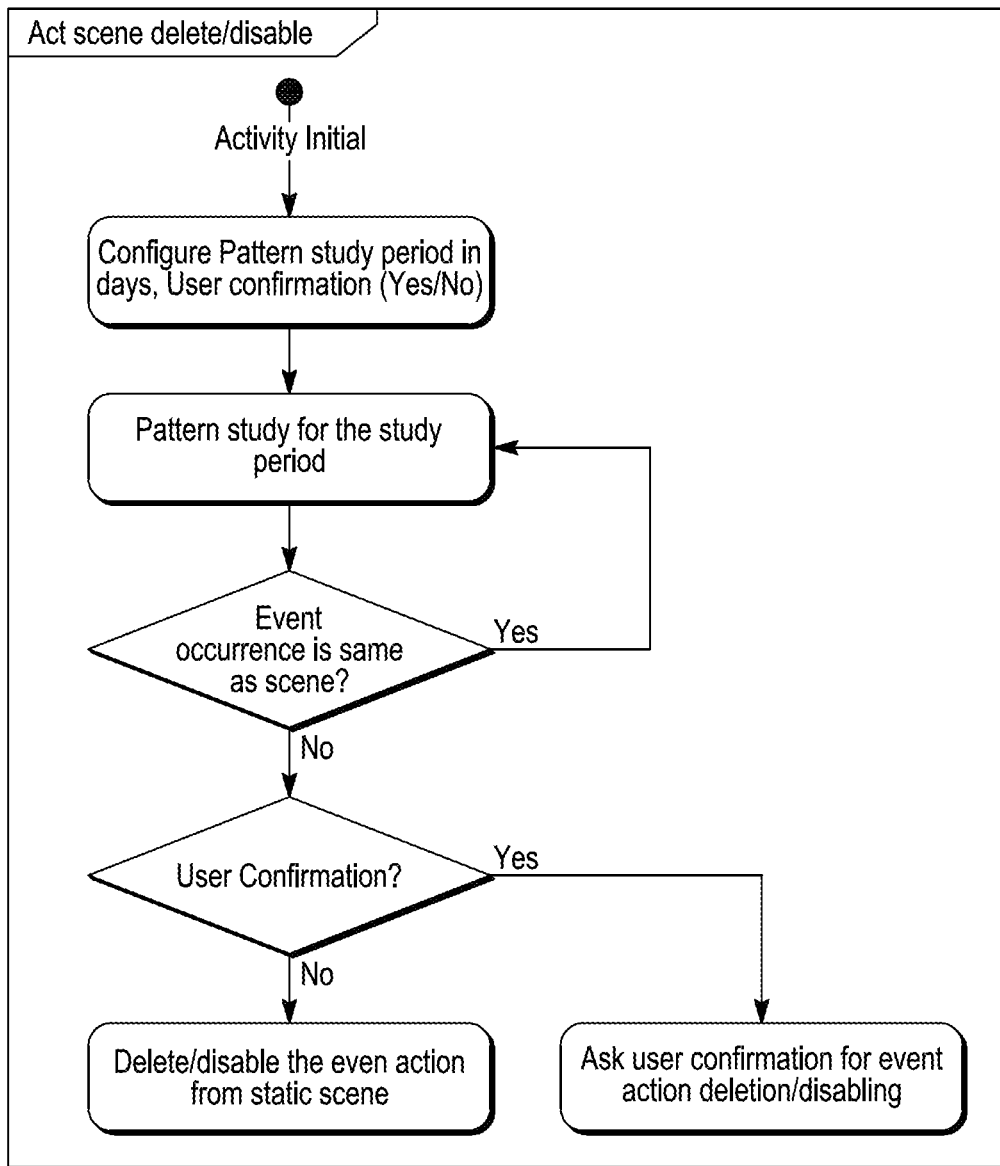
FIG. 3 illustrates a set of steps that may be used by the system of FIG. 1.

For example, FIGS. 2 and 3 depict the method of implementing the smart scene management. The events detected by sensors and other activities detected within the secured premises are pushed to the cloud and a pattern study is conducted in the cloud around the context of the previously entered static scenes. The patterns derived from study of the data and deviations observed from that study will lead to modifications and suggestions for changes to the existing scenes and to the creation of new scenes.

The home automation system or security panel will often have a number of preconfigured static scenes to perform a desired set of actions based on set of anticipated events. Over a preconfigured period, a pattern study will be done using data from existing cameras and sensors within the premises. In the pattern study, a number of relevant reference points are identified. First, a set of user events associated with the existing static scenes are identified. Second, deviations observed consistently over the preconfigured period are noted. For example, the actual times of arming and disarming of the security panel is captured and any deviations from the preconfigured static scene noted. Based on this study, a proposed modification is generated and send to the user for confirmation. Upon user confirmation, the panel executes the modified scenes based on the pattern study.

New scenes can be added to the system. In the premises, there are always a few desired event actions that are manually entered by the user after a particular user event has occurred and which are found to be not present in the list of static scenes. These user event actions can be detected by the system and proposed for addition to existing scenes.

The home automation system and/or security panel will always have a number of preconfigured static scenes that cause a set of actions to be performed based on a predefined set of expected events. Over a preconfigured period, the pattern study is done with the use of existing cameras and sensors in the premises. In the pattern study a number of points are identified. First, a set of events detected by one or more of the sensors or detected by the panel over the observation time are identified and which are not directly associated with any of the existing scenes. Second, a set of desired actions performed by the panel over the observation time are identified which are not directly associated with any of the existing scenes. Based on this pattern study, proposed modified scenes are prepared and intimated to the user for confirmation.

Based upon this process, unnecessary scenes can be deleted or disabled. In this situation, the security product initially operates with the static scenes configured and operating. After the pattern study for a preconfigured period has been performed, the study will reveal that a set of desired actions performed by the panel are not required based on the study of events occurring at the premises.

For example, at the time of installation, a set of lights near a swimming pool may be configured to be ON for a particular time period. But, the Pattern study revealed that no motion has been observed near that swimming pool area during that period of time. As a consequence, the pattern study module will propose deleting/disabling the unnecessary event actions from the preconfigured scenes.

The system may also improve smart energy utilization within the premises. For example, by modifying the existing scenes based on the real use pattern detected in the home and receiving permission from the user, unnecessary event actions in the home can be deleted. The pattern of smart energy utilization can be implemented in the home with minimal involvement by the user. For example the home lights and air conditioning may be configured to be ON at 6 pm. But, in use, the user actually arrives home by about 8 pm in most cases. As a result, the system automatically modifies the light and air condition time to 8 pm. In this way Smart energy utilization can be easily and quickly achieved in the premises.

User comfort and convenience are improved by the results of the pattern study. For example, based on the pattern study, new event actions can be proposed as new actuator files for inclusion with the existing static scenes. This improves user comfort and convenience.

In general, the system includes an automation system that protects a secured geographic area, a plurality of sensors of the automation system that detect threats within the secured area, a plurality of prospective events defined within a memory of the automation system, each event including at least a physical change in an environment of the secured area, a time of execution of the physical change and a corresponding actuator that causes the physical change, a processor of the automation system that periodically activates the corresponding actuator at the time of each of the plurality of events, a processor that monitors each of the plurality of sensors for activation by an authorized human user and that saves a record of each activation to a cloud memory and a cloud processor that monitors the saved activation records of each sensor over a time period, determines a difference between the saved activations and the plurality of events and that modifies the plurality of events based upon the determined differences.

Alternatively, the system includes a home automation system that automates a plurality of functions within a home, a security system of the home automation system that protects a secured geographic area of the home, a plurality of sensors of the security system that detect threats or a presence of an authorized human user within the secured area, a plurality of prospective events otherwise controlled by the authorized human user defined within a memory of the security system, each event including at least a physical change in an environment of the secured area, a time of execution of the physical change and a corresponding actuator that causes the physical change, a processor of the home automation system that periodically activates the corresponding actuator at the time of each of the plurality of events, a processor that monitors each of the plurality of sensors for activation by the authorized human user and that saves a record of each activation to a cloud memory and a cloud processor that monitors the saved activation records of each sensor over a time period, determines a difference between the saved activations and the plurality of events and that modifies the plurality of events based upon the determined differences.

Alternatively, the system includes a home automation system that automates a plurality of functions within a home, a security system of the home automation system that protects a secured geographic area of the home, a processor of the security system that detects events associated with a presence of an authorized human user within the secured area and saves a record of each event to a cloud memory, at least one prospective event that physically changes a portion of an environment of the secured area saved within a memory of the security system, the at least one event including at least a prospective time of the physical change and an identifier of a corresponding actuator that causes the physical change, a processor of the home automation system that periodically activates the corresponding actuator at the time of the at least one event and a cloud processor that processes the saved records over a time period, determines a difference between the saved records associated with the presence of the human user and the at least one prospective event and that modifies the at least one prospective event based upon the determined difference. Based on monitored sensors, the cloud processor can find an altogether new pattern as well, which the cloud processor suggests to the authorized human user for consideration in addition to the plurality of the prospective events which upon selection by the human user leads to a proposal for activations of at least some of the corresponding actuators for consideration by the human user as an addition to the saved activations of the prospective events.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
a processor retrieving respective data from each of a plurality of sensors within a secured area from a predetermined period of time;
the processor comparing the respective data from each of the plurality of sensors to a plurality of preconfigured static scenes for the secured area stored in a memory device; and
responsive to comparing the respective data from each of the plurality of sensors to the plurality of preconfigured static scenes, the processor identifying a modification to the plurality of preconfigured static scenes.

2. The method of claim 1 further comprising:
the processor identifying a set of user events associated with the plurality of preconfigured static scenes;
the processor identifying a consistent deviation between the respective data from at least one of the plurality of sensors and the set of user events; and
responsive to identifying the consistent deviation, the processor identifying the modification.

3. The method of claim 1 further comprising:
the processing identifying a set of user events associated with the plurality of preconfigured static scenes;
the processor identifying a repeating event associated with the respective data from at least one of the plurality of sensors that is inconsistent with the set of user events; and
responsive to identifying the repeating event, the processor identifying the modification.

4. The method of claim 1 further comprising:
the processor identifying a set of user events associated with the plurality of preconfigured static scenes;
the processor identifying a pattern associated with the respective data from at least one of the plurality of sensors;
the processor identifying a deviation between the pattern and the set of user events; and
responsive to the deviation, the processor identifying the modification.

5. The method of claim 1 further comprising:
the processor using the respective data from each of the plurality of sensors to identify a set of events unassociated with any of the plurality of preconfigured static scenes;
the processor using the respective data from each of the plurality of sensors to identify a set of desired actions unassociated with any of the plurality of preconfigured static scenes; and
the processor using the set of events and the set of desired actions to identify the modification.

6. The method of claim 1 further comprising:
the processor soliciting user confirmation for the modification; and
responsive to the user confirmation, the processor using the modification to modifying the plurality of preconfigured static scenes.

7. The method of claim 1 further comprising:
the processor using the modification to add a new static scene to the plurality of preconfigured static scenes.

8. The method of claim 1 further comprising:
the processor using the modification to delete or disable one of the plurality of preconfigured static scenes.

9. The method of claim 1 further comprising:
the processor using the modification to modify one of the plurality of preconfigured static scenes.

10. The method of claim 1 wherein each of the plurality of preconfigured static scenes is associated with activation of a respective set of actuators within the secured area at a respective time.

11. A system comprising:
a processor in communication with a plurality of sensors within a secured area; and
a memory device in communication with the processor,
wherein the processor retrieves respective data from each of the plurality of sensors from a predetermined period of time,
wherein the processor compares the respective data from each of the plurality of sensors to a plurality of preconfigured static scenes for the secured area stored in the memory device, and
wherein, responsive to comparing the respective data from each of the plurality of sensors to the plurality of preconfigured static scenes, the processor identifies a modification to the plurality of preconfigured static scenes.

12. The system of claim 11 wherein the processor identifies a set of user events associated with the plurality of preconfigured static scenes, identifies a consistent deviation between the respective data from at least one of the plurality of sensors and the set of user events, and responsive to identifying the consistent deviation, identifies the modification.

13. The system of claim 11 wherein the processing identifies a set of user events associated with the plurality of preconfigured static scenes, identifies a repeating event associated with the respective data from at least one of the plurality of sensors that is inconsistent with the set of user events, and responsive to identifying the repeating event, identifies the modification.

14. The system of claim 11 wherein the processor identifies a set of user events associated with the plurality of preconfigured static scenes, identifies a pattern associated with the respective data from at least one of the plurality of sensors, identifies a deviation between the pattern and the set of user events, and responsive to the deviation identifies the modification.

15. The system of claim 11 wherein the processor uses the respective data from each of the plurality of sensors to identify a set of events unassociated with any of the plurality of preconfigured static scenes, uses the respective data from each of the plurality of sensors to identify a set of desired actions unassociated with any of the plurality of preconfigured static scenes, and uses the set of events and the set of desired actions to identify the modification.

16. The system of claim 11 wherein the processor solicits user confirmation for the modification and, responsive to the user confirmation, uses the modification to modifying the plurality of preconfigured static scenes.

17. The system of claim 11 wherein the processor uses the modification to add a new static scene to the plurality of preconfigured static scenes.

18. The system of claim 11 wherein the processor uses the modification to delete or disable one of the plurality of preconfigured static scenes.

19. The system of claim 11 wherein the processor uses the modification to modify one of the plurality of preconfigured static scenes.

20. The system of claim 11 wherein each of the plurality of preconfigured static scenes is associated with activation of a respective set of actuators within the secured area at a respective time.

* * * * *